Patented Sept. 5, 1950

2,521,073

UNITED STATES PATENT OFFICE 2,521,073

CEMENT FOR LIGHTWEIGHT CONCRETE
AND METHOD OF MAKING

Norman C. Ludwig, Chicago, Ill., assignor to Universal Atlas Cement Company, a corporation of Indiana No Drawing. Application March 17, 1948,
Serial No. 15,497

5 Claims. (Cl. 106—86)

This invention relates generally to hydraulic cement and, in particular, to a cement suitable for making porous or lightweight concrete, by reason of its remarkable air-entraining property.

This is in part a continuation of my application Serial No. 668,321, filed May 8, 1946, now abandoned, for "Cement Composition and Method of Making."

Light-weight concrete, i. e., concrete having a density less than about 140# p. c. f. (pounds per cubic foot), the density of ordinary concrete, is desirable for many purposes, such as wall panels, insulating blocks, etc. Such concrete has been made heretofore principally by utilizing lightweight aggregates, such as Haydite (expanded clay) or Vermiculite (exfoliated mica), containing entrapped air which gives them a low density. It has also been proposed to incorporate in concrete mixes air-entraining or foam-producing agents not only for the production of light-weight concrete but also to increase the plasticity and workability of the wet mix and the resistance of the concrete to weathering. Cement mortars have been thus produced containing entrained air up to about 20% by volume. Concrete made from so-called air-entraining cements known heretofore, however, usually contains only from 2 to 5% air by volume. Such small amounts of entrained air do not reduce the weight of concrete to the extent necessary for most uses of light-weight material, where 50 to 60% air is sometimes wanted. Attempts to entrain such large quantities of air by adding air-entraining agents to cement have not heretofore been successful because the foam produced lacks stability and proper size distribution.

It is the object of my invention to provide a cement adapted for the manufacture of light-weight concrete, having an air-entraining agent incorporated therein which is highly effective in producing foam or bubbles having a high stability, and is cheap, readily obtainable, and usable without material modification of conventional practice in mixing, pouring and curing.

I have discovered that the addition to Portland cement of from 0.0625% to 0.4% by weight of the fraction of a coal-tar hydrocarbon extract of pine wood which is insoluble in petroleum hydrocarbons, known as Vinsol resin, imparts unusual air-entraining properties to a wet mix made therefrom. The stability of the foam produced, however, is somewhat lower than could be desired, resulting in shrinkage of the concrete after placing. I have further discovered that the addition of wheat flour to Portland cement in amounts between 0.5% and 5.0% by weight gives to a wet mix thereof considerable air-entraining ability. Somewhat larger quantities of this additive are required to impart the air-entraining property characteristics of a given addition of Vinsol resin, but the foam produced is very stable. I have also discovered that the addition of from 1% to 2% wheat flour to a cement mix containing from 0.0625% to 0.40% of Vinsol resin renders the abundant foam produced by the latter exceptionally stable so that castings thereof exhibit very little shrinkage on setting.

The stabilizing effect of the wheat-flour addition is not apparent when used with air-entraining agents other than Vinsol resin so I conclude that there is a reaction of some kind between the resin and flour. The combination of Vinsol resin and wheat flour as an additive to Portland cement produces in the mix finely divided air bubbles of remarkable stability. These materials are compatible with the compounds present in cement and their foam-producing and foam-stabilizing functions are not impaired thereby. The wheat flour may be added to the dry cement powder and mixed thoroughly therewith before the addition of water. The effectiveness of wheat flour as an air-entraining agent in itself is improved, however, by dissolving it in an alkaline solution. The air-entraining effect of the wheat flour is further increased if the flour is milled from a high-gluten wheat. Instead of wheat flour, the gluten derived therefrom may be employed. Soy-bean flour may be used instead of wheat flour. The Vinsol resin is preferably added in the form of a solution in dilute sodium hydroxide.

Table I below shows the air-entraining effect of additions of various amounts of wheat flour alone or equivalent (gluten, soy-bean flour) to Portland cement. The samples from which the data given were obtained were made by mixing slurries of 60 parts of water to 100 parts of Portland high-early-strength cement plus the specified additive in the amount stated. After mixing for 10 minutes, the density of the slurry was measured and the air content calculated from the density of a similar slurry consisting of water and cement only.

*Table I*

| Dry Additive, Parts per 100 Parts Cement | Paste Density, p. c. f. | Air, Per Cent | Compressive Strength, p. s. i., 2" cube after 3 days— | |
|---|---|---|---|---|
| | | | at 70° F. | at 140° F. |
| None | 109 | 0 | 2,409 | 4,850 |
| Ordinary Wheat Flour: | | | | |
| 0.5 | 95 | 12.8 | 1,656 | 2,988 |
| 1 | 90 | 17.4 | 1,106 | 3,075 |
| 3 | 77 | 29.4 | 551 | 1,142 |
| 5 | 70 | 35.8 | 375 | Not Set |
| 10 | 62 | 43.1 | Not Set | Not Set |
| High-Gluten Wheat Flour: | | | | |
| 0.5 | 68 | 37.6 | 672 | 1,142 |
| 1 | 62 | 43.1 | 551 | 872 |
| 3 | 54 | 50.5 | 308 | 474 |
| 5 | 51 | 53.2 | 169 | Not Set |
| 10 | 62 | 43.1 | Not Set | Not Set |
| Gluten from Wheat: | | | | |
| 0.5 | 70 | 35.8 | 544 | 1,318 |
| 1 | 64 | 41.3 | 381 | 799 |
| 3 | 58 | 46.8 | 299 | 407 |
| 5 | 57 | 47.7 | 242 | Not Set |
| 10 | 62 | 43.1 | Not Set | Not Set |
| Soy Bean Flour: | | | | |
| 1 | 80 | 26.6 | 188 | 1,379 |
| 3 | 69 | 36.7 | Not Set | 936 |
| 5 | 67 | 38.5 | Not Set | 941 |

I have found that greater air-entraining ability is imparted to the mix if, instead of adding wheat flour as such to the dry cement powder, it is added to the wet mix after being dissolved in a dilute alkaline solution. For example, I dissolved 5 g. of ordinary wheat flour, high-gluten wheat flour and gluten in separate quantites of a 1.4% NaOH solution and added sufficient of each resulting solution to a separate cement mix to give 1% of additive by weight, reducing the water for mixing by a corresponding amount. The results are as follows:

*Table II*

| Additive, Parts per 100 Parts Cement | Paste Density, p. c. f. | Air, Per Cent | Compressive Strength, p. s. i., 2" cube after 3 days— | |
|---|---|---|---|---|
| | | | at 70° F. | at 140° F. |
| 1 Ordinary Wheat Flour | 77 | 29.4 | 1,113 | 1,683 |
| 1 High-Gluten Wheat Flour | 49 | 55.0 | 414 | 478 |
| 1 Gluten | 53 | 51.3 | 306 | 352 |

These results show that wheat flour or gluten is much more effective in imparting air-entraining properties when added as a solution than when added dry to the cement powder. Instead of adding the alkaline solution of wheat flour or gluten to the cement, I may add it to the cement clinker from the kiln and grind the solution and clinker together. I may also add the powdered Vinsol resin or the neutralized Vinsol resin solution to the dry cement or to the cement clinker in the grinding process.

Light-weight concrete may be readily made using one of the air-entraining additives disclosed above and a light aggregate such as Haydite or Vermiculite. The following table gives the results of tests using wheat flour with these aggregates and also the characteristics of concrete made with these aggregates and without any additive, for the purpose of comparison. The cement-aggregate ratio used in all cases was 1:4.

*Table III*

| Additive | Aggregate | Density, Lb./Cu. Ft. | | Compressive Strength, p. s. i., 3" x 6" Cylinders | |
|---|---|---|---|---|---|
| | | Wet Concrete | Dry Concrete [1] | 3 days | 7 days |
| None | Haydite | 101 | 89 | 635 | 935 |
| 3% Wheat Flour | do | 70 | 63 | 100 | 140 |
| None | Vermiculite | 75 | 52 | 200 | 250 |
| 3% Wheat Flour | do | 47 | 31 | 65 | 75 |

[1] After 7 days in moist cabinet and 7 days in air.

Of the aggregates referred to in Table III, that identified as "Haydite" is an expanded clay obtained by processing ordinary clay at temperatures of approximately 2200° F. Expansion is probably caused by the effects of expanding gases on the components in a semi-fluid state. The composition of the clays used in producing "Haydite" varies, depending on their source. The apparent density of "Haydite" is from about 60 to 70 p. c. f., depending upon the raw materials, degree of expansion, and gradation of the product.

The "Vermiculite" referred to in Table III is an expanded mica manufactured by treating mica ore at high temperatures. The process is somewhat similar to popping corn as the mica ore is moved across the surface of a hot plate. In the mica ore, small amounts of water are held between each lamination, and when suddenly exposed to high temperatures, the water changes to steam and explodes the particles into cellular granules about fifteen times the original size. The apparent density of the "Vermiculite" varies from about two to twelve pounds per cubic foot, depending upon the ore used, the treatment and the gradation.

Additives capable of entraining sufficiently large amounts of air, i. e., above approximately 50%, would make possible the production of light-weight concrete without requiring the use of aggregates, such as Haydite and Vermiculite, which lighten concrete in which they are used by the air entrapped therein, or with the use of smaller amounts thereof. Where it is desired to entrain such large amounts of air in a wet cement mix, however, the wheat flour, gluten or soy-bean flour when added alone is not as effective as desired and larger amounts are required. These amounts affect the hardening properties of the cement as shown by the results given in Table I. I have discovered that the fraction of the extract of pine wood in a coal-tar hydrocarbon, which is insoluble in petroleum hydrocarbon, is very effective when added to Portland cement, in imparting air-entraining properties to the mix. This material is known as Vinsol resin. When neutralized with NaOH to form a rosin soap and added to cement, it produces an abundant foam in the mix. The foam while plentiful is not as durable as desired and I accordingly prefer to use wheat flour or its equivalent as an additive to supplement and cooperate with the Vinsol resin. The flour not only acts as an air-entraining agent itself but (which is more important) lends remarkable stability to the foam produced by the Vinsol resin. The combined effect of the two additives is superior to that of either one, considering the desirability of a minimum amount of additive and minimum shrinkage, i. e., foam stability, as well as maximum air content. The following table gives the results of tests using Vinsol resin and wheat flour alone and then both together:

*Table IV*

| Additive—Per Cent | Density of Mix, p. c. f. | Air Content, Per Cent | Shrinkage, Per Cent | Compressive Strength,[1] 2" cubes, p. s. i. | |
|---|---|---|---|---|---|
| | | | | 24 hr. | 3 da. |
| NVR—0.0625 | 78.5 | 27.8 | 4.7 | 232 | 832 |
| NVR—0.125 | 51.7 | 52.5 | 6.5 | 147 | 338 |
| NVR—0.25 | 43.1 | 60.3 | 6.9 | 107 | 188 |
| Wheat Flour—2.0 | 82.9 | 23.4 | 2.0 | 463 | 1,027 |
| Wheat Flour—3.0 | 72.5 | 33.0 | 2.6 | 268 | 652 |
| Alk. Wh. Flour Sol [2]—1.0 | 77.0 | 29.4 | 2.1 | 399 | 1,113 |
| Alk. Wh. Flour Sol—2.0 | 62.8 | 41.9 | 2.5 | 169 | 377 |
| 1.00% SW [4]+0.0625% NVR [3] | 74.8 | 31.0 | 2.5 | 198 | 473 |
| 1.50% SW+0.0625% NVR | 58.0 | 46.4 | 2.7 | 180 | 358 |
| 1.00% SW+0.125% NVR | 51.3 | 52.6 | 2.8 | 125 | 253 |
| 1.50% SW+0.125% NVR | 45.0 | 58.4 | 2.9 | 85 | 195 |
| 1.00% W [5]+0.125% NVR | 65.0 | 40.0 | 2.4 | 215 | 522 |
| 2.00% W+0.125% NVR | 60.1 | 45.2 | 2.5 | 203 | 325 |
| 1.00% W+0.40% NVR | 48.7 | 55.0 | 2.9 | 111 | 222 |
| 2.00% W+0.40% NVR | 42.2 | 61.1 | 3.1 | 105 | 187 |

[1] Average of three specimens.
[2] Solution consists of 5% wheat flour dissolved in 1.5% solution of NaOH.
[3] NVR—Neutralized Vinsol resin solution. 23 g. resin dissolved in 100 ml. of a 3.5% NaOH solution.
[4] SW—Wheat Flour solution. 5 g. wheat flour dissolved in 100 ml. of a 1.5% NaOH solution.
[5] W—Wheat Flour used as powder with cement.

The use of both wheat flour and Vinsol resin as additives is particularly desirable in the production of light-weight concrete since it even makes this possible without using a light-weight aggregate although a small amount of the latter may be used if extremely light-weight concrete is desired. The following table shows the results of tests on light-weight concrete both with and without aggregates:

*Table V*

| No. Test | Additive, Per Cent Weight of Cement | Aggregate, Parts by Weight of Cement | Water, Per Cent Weight Cmt. | Per Cent Air Content | Density, lb./cu. ft. | | Comp. Stren. p. s. i., 2" cubes | |
|---|---|---|---|---|---|---|---|---|
| | | | | | Wet Concrete | Dry Concrete | 3 Da. | 7 Da. |
| 1 | None | None | 60 | 0 | 108.7 | 107.2 | 2100 | |
| 2 | 0.4 NVR [1]+2 W [2] | None | 60 | 62 | 41.3 | 33.2 | | 155 |
| 3 | 0.4 NVR+1 W | None | 60 | 55 | 48.7 | 40.9 | 111 | 222 |
| 4 | 0.125 NVR+1 SW [3] | None | 60 | 52.6 | 51.3 | 43.5 | 125 | 253 |
| 5 | None | 100 asbestos fiber | 266 | (4) | 78.0 | 39.0 | | 277 |
| 6 | 0.4 NVR+2 W | 40 asbestos fiber | 120 | | 39.5 | 24.4 | | 47 |
| 7 | 0.4 NVR+2 W | 43 Vermiculite | 140 | | 43.2 | 25.7 | | 113 |
| 8 | 0.4 NVR+2 W | 10 glass wool | 65 | | 38.0 | 28.0 | | 212 |
| 9 | 0.4 NVR+2 W | 10 Cellulose fiber | 140 | | 43.3 | 25.8 | | 69 |

[1] NVR—Neutralized Vinsol resin solution. 23 g. resin dissolved in 100 ml. of a 3.5% NaOH solution.
[2] W—Ordinary wheat flour.
[3] SW—Wheat flour solution. 5 g. wheat flour dissolved in 100 ml. of a 1.5% NaOH solution.
[4] The air content cannot be determined with any degree of accuracy in concrete mixes containing aggregates such as asbestos fiber, vermiculite and cellulose fiber.

The results obtained in Tests 2, 3, and 4, as compared to those of Test 1, show that lightweight products can be easily produced by the use of the combined additives without the addition of a lightweight aggregate. The results of Tests 5 and 6 illustrate the decrease in the density of the concrete product obtainable by the use of the combined additives and show the saving that can be made in the quantity of asbestos fiber by replacing that aggregate with entrained air. Tests 7, 8 and 9 are included to show that the combined additives will work equally well with three other common lightweight aggregates.

It will be apparent from the foregoing that my invention provides a highly effective foam-producing additive for Portland cement which is cheap, readily available and easy to use. It affords a practical solution for the problem of entraining large quantities of air into a wet cement mix and maintaining the resulting foam substantially stable over the setting period so that shrinkage during setting is not serious. It also makes possible the production of lightweight concrete with aggregate other than lightweight aggregates, using a minimum amount of the latter or none at all.

I claim:

1. In a method of making porous concrete, the steps including adding to Portland cement from 1 to 2% wheat flour by weight and from .0625% to .40% by weight of the neutralized fraction of the coal-tar-hydrocarbon extract of pine wood which is insoluble in petroleum hydrocarbons, and adding water to produce a wet mix.

2. The method defined by claim 1 characterized by said wheat flour being dissolved in an alkaline solution.

3. The method defined by claim 1 characterized by said fraction being dissolved in an alkaline solution.

4. As a new composition of matter, a mixture of Portland cement, from 1 to 2% wheat flour by weight and from .0625% to .40% by weight of the neutralized fraction of the coal-tar-hydrocarbon extract of pine wood which is insoluble in petroleum hydrocarbons.

5. In a method of making an air-entraining Portland cement mix, the step of adding to Portland cement from 1 to 2% of wheat flour by weight and from .0625% to .40% by weight of the neutralized fraction of the coal-tar-hydrocarbon extract of pine wood which is insoluble in petroleum hydrocarbons.

NORMAN C. LUDWIG.

REFERENCES CITED

The following references are of record in the file of this patent:

UNITED STATES PATENTS

| Number | Name | Date |
|---|---|---|
| 254,247 | Fronc | Feb. 28, 1882 |
| 2,207,339 | Camp | July 9, 1940 |
| 2,215,812 | Kaplan | Sept. 24, 1940 |
| 2,228,019 | Scripture | Jan. 7, 1941 |